United States Patent [19]
Gutierrez et al.

[11] Patent Number: 5,792,730
[45] Date of Patent: Aug. 11, 1998

[54] LUBRICATING OIL SUCCINIMIDE DISPERSANTS DERIVED FROM HEAVY POLYAMINE

[75] Inventors: Antonio Gutierrez, Mercerville, N.J.; Jacob I. Emert, Brooklyn, N.Y.; Robert D. Lundberg, Williamsburg, Va.; Eric Bannister, Colts Neck, N.J.

[73] Assignee: Exxon Chemical Patents, Inc., Linden, N.J.

[21] Appl. No.: 895,156

[22] Filed: Jul. 16, 1997

Related U.S. Application Data

[63] Continuation of Ser. No. 701,006, Aug. 21, 1996, abandoned, which is a continuation of Ser. No. 273,294, Jul. 11, 1994, abandoned.

[51] Int. Cl.$^6$ ............... C10M 133/44; C10M 133/58; C10M 149/18; C10M 149/12
[52] U.S. Cl. .................. 508/232; 508/241; 508/291; 508/293; 508/454
[58] Field of Search ............... 508/232, 241, 508/291, 293, 454

[56] References Cited

U.S. PATENT DOCUMENTS

| | | | |
|---|---|---|---|
| 4,152,499 | 5/1979 | Boerzel et al. | 526/52.4 |
| 4,234,435 | 11/1980 | Meinhardt et al. | 252/51.5 |
| 4,665,208 | 5/1987 | Welborn et al. | 556/179 |
| 4,713,188 | 12/1987 | Wollenberg | 252/51.5 |
| 4,840,744 | 6/1989 | Wollenberg et al. | 252/51.5 A |
| 4,871,705 | 10/1989 | Hoel | 502/117 |
| 4,927,551 | 5/1990 | Erdman et al. | 252/42.7 |
| 4,937,299 | 6/1990 | Ewen et al. | 526/119 |
| 4,938,881 | 7/1990 | Ripple et al. | 252/32.7 |
| 4,952,739 | 8/1990 | Chen | 585/18 |
| 5,017,714 | 5/1991 | Welborn | 556/12 |
| 5,053,152 | 10/1991 | Steckel | 252/51.5 R |
| 5,055,438 | 10/1991 | Canich | 502/117 |
| 5,057,475 | 10/1991 | Canich et al. | 502/104 |
| 5,064,802 | 11/1991 | Stevens et al. | 502/155 |
| 5,096,867 | 3/1992 | Canich | 502/103 |
| 5,114,435 | 5/1992 | Abramo et al. | 44/348 |
| 5,120,867 | 6/1992 | Welborn | 556/12 |
| 5,153,157 | 10/1992 | Hlatky et al. | 502/117 |
| 5,160,648 | 11/1992 | Steckel | 252/47.5 |
| 5,164,101 | 11/1992 | Brownawell et al. | 252/25 |
| 5,171,466 | 12/1992 | Korosec | 252/51.5 A |
| 5,198,401 | 3/1993 | Turner et al. | 502/155 |
| 5,227,440 | 7/1993 | Canich et al. | 526/129 |
| 5,230,714 | 7/1993 | Steckel | 44/432 |
| 5,232,616 | 8/1993 | Harrison et al. | 252/51.5 A |
| 5,241,003 | 8/1993 | Degonia et al. | 525/123 |
| 5,241,025 | 8/1993 | Hlatky et al. | 526/129 |
| 5,277,833 | 1/1994 | Song et al. | 252/56 R |
| 5,334,321 | 8/1994 | Harrison et al. | 252/51.5 A |
| 5,356,552 | 10/1994 | Harrison et al. | 252/51.5 A |

FOREIGN PATENT DOCUMENTS

| | | | |
|---|---|---|---|
| 129368 | 12/1984 | European Pat. Off. | C08F 10/00 |
| 277003 | 8/1988 | European Pat. Off. | C08F 4/64 |
| 277004 | 8/1988 | European Pat. Off. | C08F 4/64 |
| 420436 | 4/1991 | European Pat. Off. | C07F 7/00 |
| 475609 | 3/1992 | European Pat. Off. | C10M 133/56 |
| 520732 | 12/1992 | European Pat. Off. | C08F 10/00 |
| WO91/04257 | 4/1991 | WIPO | C07F 7/00 |
| WO92/00333 | 1/1992 | WIPO | C08F 4/76 |
| WO93/08199 | 4/1993 | WIPO | C07F 7/28 |
| WO93/08221 | 4/1993 | WIPO | C08F 10/00 |

OTHER PUBLICATIONS

"Technical Bulletin Union Carbide Corporation" (date unknown).
"Ethyleneamines (1994) Brochure from Union Carbide Corporation".
"Ethyleneamines (1991) Dow Chemical Company".

*Primary Examiner*—Jerry D. Johnson
*Attorney, Agent, or Firm*—Ohlandt, Greeley Ruggiero & Perle

[57] ABSTRACT

A succinimide dispersant, which is the reaction product of hydrocarbons or polymers functionalized by halogenation (e.g. chlorination), thermal "ene" reaction or free radical grafting and derivatized with a heavy polyamine. A heavy polyamine is a mixture of polyalkylenepolyamines comprising small amounts of lower polyamine oligomers such as tetraethylene pentamine and pentahexamine but primarily oligomers with 7 or more nitrogens, 2 or more primary amines per molecule, and more extensive branching than conventional polyamine mixtures.

20 Claims, No Drawings

LUBRICATING OIL SUCCINIMIDE DISPERSANTS DERIVED FROM HEAVY POLYAMINE

This is a continuation of application Ser. No. 08/701,006, filed Aug. 21, 1996 now abandoned which is a continuation of application Ser. No. 08/273,294 filed Jul. 11, 1994 now abandoned.

FIELD OF THE INVENTION

The invention relates to succinimide dispersant additives prepared from functionalized hydrocarbons or polymers reacted (e.g. derivatized) with "heavy polyamines". "Heavy polyamine" as referred to herein includes mixtures of higher oligomers of polyalkylene, e.g. polyethylene, amines containing, e.g., essentially no tetraethylene pentamine, small amounts of pentaethylenehexamine but primarily oligomers with 7 or more nitrogens, 2 or more primary amines per molecule and more branching than conventional polyamine mixtures. Use of heavy polyamine allows for incorporation of greater amounts of nitrogen into the dispersant molecule than prior art amines and thusly, superior sludge dispersancy properties are obtained. The succinimide dispersants disclosed herein are useful as additives in fuel and lubricating oils.

BACKGROUND OF THE INVENTION

U.S. Ser. No. 261,554 entitled "Lubricating Oil Dispersants Derived from Heavy Polyamine", filed Jun. 17, 1994, discloses amidation (derivatization) of polymers functionalized by the Koch reaction with heavy polyamine and is incorporated by reference herein. U.S. Ser. No. 261,507, Attorney Docket No. PT-1143, entitled "Amidation of Ester Functionalized Hydrocarbon Polymers", filed Jun. 17, 1994, discloses a preferred amidation process for polymers functionalized by the Koch reaction and use of heavy polyamine therein and is incorporated by reference herein.

Polyalkenyl succinimides are a widely used class of dispersants for lubricant and fuels applications. They are prepared by the reaction of, for example, polyisobutylene with maleic anhydride to form polyisobutenylsuccinic anhydride, and a subsequent condensation reaction with polyethylene amines.

EP-A 0 475 609 A1 discloses the use of "heavy polyamine" which is disclosed to be a mixture of polyethyleneamines sold by Union Carbide Co. under the designation Polyamine HPA-X.

U.S. Pat. No. 5,230,714 discloses the use of "polyamine bottoms" derived from an alkylene polyamine mixture. "Polyamine bottoms" are characterized as having less than 2, usually less than 1% by weight of material boiling below about 200° C. In the case of ethylene polyamine bottoms, the bottoms were disclosed to contain less than about 2% by weight total diethylene triamine (DETA) or triethylene tetraamine (TETA). A typical sample of such ethylene polyamine from Dow Chemical Company, designated as "E-100" was disclosed to have a percent nitrogen by weight of 33.15 and gas chromatography analysis showed it to contain about 0.93% "Light Ends" (DETA), 0.72% TETA, 21.74% tetraethylene pentamine and 76.61% pentaethylene hexamine and higher (by weight).

U.S. Pat. No. 4,938,881 similarly discloses the use of "polyamine bottoms".

U.S. Pat. No. 5,164,101 discloses the polybutenylsuccinimide of polyamines, wherein the polyamine has a specific formula.

U.S. Pat. No. 5,114,435 discloses a polyalkylenesuccinimide prepared from a polyalkylenesuccinnic acid or anhydride reacted with a polyalkylene polyamine of a specific formula. Hexaethylene heptamine is disclosed to be a suitable amine.

U.S. Pat. No. 4,927,551 discloses a polybutenyl succinnic anhydride reacted with Dow E-100 heavy polyamine (average Mw=303 available from Dow Chemical Company).

U.S. Pat. No. 5,241,003 discloses succinimides derived from amines of a specific formula. Various suitable low cost polyethylene polyamine mixtures are disclosed to be available under various trade designations such as "Polyamine H", "Polyamine 400", Dow Polyamine E-100" and "Dow S-1 107".

U.S. Pat. No. 4,152,499 discloses isobutene polymer reacted with maleic anhydride and this adduct then converted into a lubricating oil additive by reaction with polyamines of a specific formula. Diethylenetriamine and triethylenetetramine are disclosed to be suitable amines.

U.S. Pat. No. 5,053,152 and the divisional thereof, U.S. Pat. No. 5,160,648, disclose condensates produced by the acid catalyzed condensation of an amine reactant with a hydroxy alkyl or hydroxy aryl reactant. The amine reactant is disclosed to be a high molecular weight extended polyamine.

SUMMARY OF THE INVENTION

The present invention is an oil soluble dispersant comprising a functionalized hydrocarbon reacted with a heavy polyamine. The present invention is also a process for producing dispersant comprising the steps of a) functionalizing by halogenating, ene reacting, or free radical grafting a backbone selected from the group consisting of hydrocarbon, polymer, and polybutene with a carboxylic acid or anhydride agent; and b) then reacting said backbone with a heavy polyamine. Heavy polyamine comprises an average of at least about 7 nitrogens per molecule, a primary amine content of at least about 6.3 to about 8.5 milliequivalents of primary amine per gram and a total nitrogen content of at least about 32 wt. %.

The present invention relates to succinimide dispersant additives prepared from functionalized hydrocarbons or polymers reacted (e.g. derivatized) with "heavy polyamines". "Heavy polyamine" as referred to herein includes a mixture of higher oligomers of polyalkylene, e.g. polyethylene, amines containing, e.g., essentially no tetraethylenepentamine, at most small amounts of pentaethylenehexamine, but primarily oligomers with more than 6 nitrogens and more branching than conventional polyamine mixtures. The succinimide dispersants disclosed herein are useful as additives in fuel and lubricating oils.

The hydrocarbons or polymers are functionalized using a variety of means including halogen assisted functionalization (e.gc. chlorination), the thermal "ene" reaction, and free radical grafting using a catalyst (e.g. peroxide) and derivatized using a "heavy polyamine".

The heavy polyamine as the term is used herein contains more than six nitrogens per molecule, but preferably polyamine oligomers containing 7 or more nitrogens per molecule and with 2 or more primary amines per molecule. The heavy polyamine comprises more than 28 wt. % (e.g. >32 wt. %) total nitrogen and an equivalent weight of primary amine groups of 120–160 grams per equivalent. Commercial dispersants are based on the reaction of carboxylic acid moieties with a polyamine such as tetraethylenepentamine (TEPA) with five nitrogens per molecule. Commercial TEPA is a distillation cut and contains oligomers with three and four nitrogens as well. Other commercial polyamines known generically as PAM, contain a mixture of ethylene amines where TEPA and pentaethylene hexamine (PEHA) are the major part of the polyamine, usually less than about 80%. Typical PAM is commercially available from suppliers such as the Dow Chemical Company under the trade name E-100 or from the Union Carbide Company as HPA-X. This mixture typically consists of less than 1.0 wt. % low molecular weight amine, 10–15 wt. % TEPA, 40–50 wt. % PEHA and the balance hexaethyleneheptamine (HEHA) and higher oligomers. Typically PAM has 8.7–8.9 milliequivalents of primary amine per gram (an equivalent weight of 115 to 112 grams per equivalent of primary amine) and a total nitrogen content of about 33–34 wt. %.

It has been discovered that heavier cuts of PAM oligomers with practically no TEPA and only very small amounts of PEHA but containing primarily oligomers with more than 6 nitrogens and more extensive branching, produce dispersants with improved dispersancy when compared to products derived from regular commercial PAM under similar conditions with the same polymer backbones. An example of one of these heavy polyamine compositions is commercially available from the Dow Chemical Company under the trade name of Polyamine HA-2.

HA-2 is prepared by distilling out the lower boiling polyethylene amine oligomers (light ends) including TEPA. The TEPA content is is less than 1 wt. %. Only a small amount of PEHA, less than 25 wt. %, usually 5–15 wt. %, remains in the mixture. The balance is higher nitrogen content oligomers usually with a greater degree of branching. The heavy polyamine preferably comprises essentially no oxygen.

Typical analysis of HA-2 gives primary nitrogen values of about 7.8 milliequivalents (meq) (e.g. 7.7–7.8) of primary amine per gram of polyamine. This calculates to be about an equivalent weight (EW) of 128 grams per equivalent (g/eq). The total nitrogen content is about 32.0–33.0 wt. %. Commercial PAM analyzes for 8.7–8.9 meq of primary amine per gram of PAM and a nitrogen content of about 33 to about 34 wt. %.

DETAILED DESCRIPTION OF THE INVENTION

The present invention relates to a derivatization (imidization), using a heavy polyamine, of functionalized hydrocarbons or polymers wherein the polymer backbones have a number average molecular weight (Mn) of greater than 300. Preferably 800 to 7500. Most preferably 1000 to 3000. The preferred number average molecular weight depends on the properties of the particular backbone. For example, for ethylene alpha olefin copolymers the preferred molecular weight is 1500 to 5000 (e.g. 2000–4000). For polybutenes the preferred molecular weight is 900 to 2000. A typical example of functionalized polymer is polyisobutenyl succinic anhydride (PIBSA) which is a reaction product of polyisobutene and maleic anhydride. This reaction can occur via halogen-assisted functionalization (e.g. chlorination), the thermal "ene" reaction, or free radical addition using a catalyst (e.g. a peroxide). These reactions are well know in the art. In the present invention the functionalized backbones are subsequently derivatized with a heavy polyamine. In the case of PIBSA, the reaction with the heavy polyamine yields a polybutenyl succinimide.

Dispersants made from backbones less than 300 Mn are useful in 2-cycle engine oils. The present invention includes dispersants useful for this application.

Suitable Hydrocarbons and Polymers

The preferred hydrocarbons or polymers employed in this invention include homopolymers, interpolymers or lower molecular weight hydrocarbons. The preferred polymers comprise at least one $C_3$ to $C_{28}$ alpha-olefin having the formula $H_2C=CHR^1$ wherein $R^1$ is straight or branched chain alkyl radical comprising 1 to 26 carbon atoms and wherein the polymer contains carbon-to-carbon unsaturation, preferably a high degree of terminal ethenylidene unsaturation. Preferably, the polymers employed in this invention comprise interpolymers of ethylene and at least one alpha-olefin of the above formula, wherein $R^1$ is allkyl of from 1 to 18 carbon atoms, and more preferably is alkyl of from 1 to 8 carbon atoms, and more preferably still 1 to 2 carbon atoms. Therefore, useful alpha-olefin monomers and comonomers include, for example, propylene, butene-1, hexene-1, octene-1, 4-methylpentene-1, decene-1, dodecene-1, tridecene-1, tetradecene-1, pentadecene-1, hexadecene-1, heptadecene-1, octadecene-1, nonadecene-1, and mixtures thereof (e.g., mixtures of propylene and butene-1, and the like). Exemplary of such polymers are propylene homopolymers, butene-1 homopolymers, ethylene-propylene copolymers, ethylene-butene-1 copolymers and the like, wherein the polymer contains at least some terminal and/or internal unsaturation. Preferred polymers are unsaturated copolymers of ethylene and propylene and ethylene and butene-1. The interpolymers of this invention may contain a minor amount, e.g. 0.5 to 5 mole % of a $C_4$ to $C_{18}$ non-conjugated diolefin comonomer. However, it is preferred that the polymers of this invention comprise only alpha-olefin homopolymers, interpolymers of alpha-olefin comonomers and interpolymers of ethylene and alpha-olefin comonomers. The molar ethylene content of the polymers employed in this invention is preferably in the range of 20 to 80%, and more preferably 30 to 70%. When propylene and/or butene-1 are employed as comonomer(s) with ethylene, the ethylene content of such copolymers is most preferably between 45 and 65%, although higher or lower ethylene contents may be present.

The polymers employed in this invention generally possess a Mn of 300 to 10,000, preferably 800 to 7,500; more preferably 1,000 to 3,000 (e.g., 1,500 to 2,500). The Mn for such polymers can be determined by several known techniques such as size exclusion chromatography (also known as gel permeation chromatography (GPC)) which also provides molecular weight distribution information.

Suitable polymers will typically have a narrow molecular weight distribution (MWD) also referred to as polydispersity, as determined by the ratio of weight average molecular weight (Mw) to (Mn). Polymers having a Mw/Mn of less than 5, preferably less than 4, are most desirable. Suitable polymers have a polydispersity of, for example, 1 to 5. Consequently, such polymers generally possess an intrinsic viscosity (as measured in tetralin at 135° C.) of 0.025 to 0.9 dl/g, preferably 0.05 to 0.5 dl/g, most preferably 0.075 to 0.4 dl/g. The polymers employed in this invention preferably exhibit a degree of crystallinity such that, when grafted, they are essentially amorphous.

Low molecular weight polymers are polymers having Mn less than 20,000, preferably 500 to 20,000 (e.g. 1,000 to 20,000), more preferably 1,500 to 10,000 (e.g. 2,000 to 8,000) and most preferably from 1,500 to 5,000. The number average molecular weights are measured by vapor phase osmometry or GPC as discussed above. Low molecular weight polymers are useful in forming dispersants for lubricant additives.

High molecular weight polymers Mn's ranging from 20,000 to 200,000, preferably 25,000 to 100,000; and more preferably, from 25,000 to 80,000 are useful for viscosity modifiers for lubricating oil compositions.

Specific examples of terminal and internal olefin monomers which can be used to prepare the polymers of the present invention according to conventional, well-known polymerization techniques include ethylene; propylene; butene-1; butene-2; isobutene; pentene-1; etc.; propylene-tetramer; diisobutylene; isobutylene trimer; butadiene-1,2; butadiene-1,3; pentadiene-1,2; pentadiene-1,3; etc.

Useful polymers include alpha-olefin homopolymers and interpolymers, and ethylene alpha-olefin copolymers and terpolymers. Specific examples of polyalkenes include polypropylenes, polybutenes, ethylene-propylene copolymers, ethylene-butene copolymers, propylene-butene copolymers, styrene-isobutene copolymers, isobutene-butadiene-1,3 copolymers, etc., and terpolymers of isobutene, styrene and piperylene and copolymers of 80% of ethylene and 20% of propylene. A useful source of polymers are the poly(isobutene)s obtained by polymerization of C4 refinery stream having a butene content of about 35 to about 75% by wt., and an isobutene content of about 30 to about 60% by wt., in the presence of a Lewis acid catalyst such as aluminum trichloride or boron trifluoride.

Also useful are the high molecular weight poly-n-butenes of U.S. Ser. No. 992871 filed Dec. 17, 1992.

A preferred source of monomer for making poly-n-butenes is petroleum feedstreams such as Raffinate II. These feedstocks are disclosed in the art such as in U.S. Pat. No. 4,952,739.

The polymers employed in this invention, which preferably are further characterized in that up to 95% and more of the polymer chains possess terminal ethenylidene-type unsaturation, may be prepared by polymerizing alpha-olefin monomer, or mixtures of alpha-olefin monomers, or mixtures comprising ethylene and at least one $C_3$ to $C_{28}$ alpha-olefin monomer, in the presence of a catalyst system comprising at least one metallocene (e.g., a cyclopentadienyl-transition metal compound) and an alumoxane compound. Interpolymers of this latter type, which are preferred interpolymers for use in the invention, may be characterized by the formula POLY-C($R^1$)=$CH_2$ wherein $R^1$ is $C_1$ to $C_{26}$ alkyl, preferably $C_1$ to $C_{18}$ alkyl, more preferably $C_1$ to $C_8$ alkyl, and most preferably $C_1$ to $C_2$ alkyl, (e.g., methyl or ethyl) and wherein POLY represents the polymer chain. The chain length of the $R^1$ alkyl group will vary depending on the comonomer(s) selected for use in the polymerization. A minor amount of the polymer chains can contain terminal ethenyl, i.e., vinyl, unsaturation, i.e. POLY-CH=$CH_2$, and a portion of the polymers can contain internal monounsaturation, e.g. POLY-CH=CH($R^1$), wherein $R^1$ is as defined above.

In the preferred polymers contemplated for use in this invention, at least about 30% of the polymer chains possess terminal ethenylidene unsaturation. Preferably at least 50%, more preferably at least 60%, and most preferably at least 75% (e.g. 75–98%), of such polymer chains exhibit terminal ethenylidene unsaturation. The percentage of polymer-chains exhibiting terminal ethenylidene unsaturation may be determined by FTIR spectroscopic analysis, titration, or $C^{13}$ NMR.

The preferred terminally unsaturated interpolymer to be used in this invention may be prepared by known metallocene chemistry. Preferred polymers to be used in this invention also may be prepared as described in U.S. Ser. Nos. 992,871; 992,690; and 992,192, all filed Dec. 17, 1992.

The preferred interpolymers can be prepared by polymerizing monomer mixtures comprising ethylene in combination with other monomers such as alpha-olefins having from 3 to 28 carbon atoms (and preferably from 3 to 4 carbon atoms, i.e., propylene, butene-1, and mixtures thereof) in the presence of a catalyst system comprising at least one metallocene (e.g., a cyclopentadienyl-transition metal compound) and an alumoxane compound. The comonomer content can be controlled through the selection of the metallocene catalyst component and by controlling the partial pressure of the various monomers. Most preferably, the polymers used in this invention are substantially free of ethylene homopolymer.

The catalyst is preferably a bulky ligand transition metal compound. The bulky ligand may contain a multiplicity of bonded atoms, preferably carbon atoms, forming a group which may be cyclic with one or more optional heteroatoms. The bulky ligand may be a cyclopentadienyl derivative which can be mono-or polynuclear. One or more bulky ligands may be bonded to the transition metal ("Group" refers to an identified group of the Periodic Table of Elements, comprehensively presented in "Advanced Inorganic Chemistry", F. A. Cotton, G. Wilkinson, Fifth Edition, 1988, John Wiley & Sons). Other ligands may be bonded to the transition metal, preferably detachable by a cocatalyst such as a hydrocarbyl or halogen leaving group. The catalyst is derivable from a compound of the formula $[L]_m M[X]_n$ wherein L is the bulky ligand, X is the leaving group, M is the transition metal and m and n are such that the total ligand valency corresponds to the transition metal valency. Preferably the catalyst is four coordinate such that the compound is ionizable to a $1^+$ valency state.

The ligands L and X may be bridged to each other and if two ligands L and/or X are present, they may be bridged. The metallocenes may be full-sandwich compounds having two ligands L which are cyclopentadienyl groups or half-sandwich compounds having one ligand L only which is a cyclopentadienyl group.

For the purposes of this patent specification the term "metallocene" is defined to contain one or more cyclopentadienyl moiety in combination with a transition metal of the Periodic Table of Elements. In one embodiment the metallocene catalyst component is represented by the general formula $(Cp)_m MR_n R'_p$ wherein Cp is a substituted or unsubstituted cyclopentadienyl ring; M is a Group IV, V or VI transition metal; R and R' are independently selected halogen, hydrocarbyl group, or hydrocarboxyl groups having 1–20 carbon atoms; m=1–3, n=0–3, p=0–3, and the sum of m+n+p equals the oxidation state of M. In another embodiment the metallocene catalyst is represented by the formulas:

$(C_5R'_m)_p R''_s (C_5R'_m) MeQ_{3-p-x}$ and $R''_s (C_5R'_m)_2 MeQ'$ wherein Me is a Group IV, V, or VI transition metal $C_5R'_m$ is a substituted cyclopentadienyl each R', which can be the same or different is hydrogen, alkenyl aryl alkaryl or arylalkyl radical having from 1 to 20 carbon atoms or two carbon atoms joined together to form a part of a $C_4$ to $C_6$ ring, R" is one or more of or a combination of a carbon, a germanium, a silicon, a phosphorous or a nitrogen atom containing radical substituting on and bridging two $C_5R'_m$ rings or bridging one $C_5R'_m$ ring back to Me, when p=0 and x=1 otherwise x is always equal to 0, each Q which can be the same or different is an aryl alkyl, alkenyl, alkaryl, or arylalkyl radical having from 1 to 20 carbon atoms or halogen. Q' is an alkylidene radical having from 1 to 20 carbon atoms, s is 0 or 1 and when s is 0, m is 5 and p is 0, 1 or 2 and when s is 1, m is 4 and p is 1.

Various forms of the catalyst system of the metallocene type may be used in the polymerization process of this invention. Exemplary of the development of metallocene catalysts in the art for the polymerization of ethylene is the disclosure of U.S. Pat. No. 4,871,705 to Hoel, U.S. Pat. No. 4,937,299 to Ewen et al., and EP-A-0 129 368 published Jul. 26, 1989, and U.S. Pat. Nos. 5,017,714 and 5,120,867 to Welborn, Jr. These publications teach the structure of the metallocene catalysts and include alumoxane as the cocatalyst. There are a variety of methods for preparing alumoxane, one of which is described in U.S. Pat. No. 4,665,208.

For the purposes of this patent specification, the terms "cocatalysts or activators" are used interchangeably and are defined to by any compound or component which can activate a bulky ligand transition metal compound. In one embodiment the activators Generally contain a metal of Group II and III of the Periodic Table of Elements. In the preferred embodiment, the bulky transition metal compound are metallocenes, which are activated by trialkylaluminum compounds, alumoxanes both linear and cyclic, or ionizing ionic activators or compounds such as tri(n-butyl) ammonium tetra(pentaflurorophenyl) boron, which ionize the neutral metallocene compound. Such ionizing compounds may contain an active proton, or some other cation associated with but not coordinated, or only loosely coordinated to the remaining ion of the ionizing ionic compound. Such compounds are described in EP-A-0520732, EP-A-0277003 and EP-A-0277004 published Aug. 3, 1988, and U.S. Pat. Nos. 5,153,157; 5,198,401; and 5,241,025. Further, the metallocene catalyst component can be a monocyclopentadienyl heteroatom containing compound. This heteroatom is activated by either an alumoxane or an ionic activator to form an active polymerization catalyst system to produce polymers useful in this invention. These types of catalyst systems are described in, for example, PCT International Publication WO 92/00333 published Jan. 9, 1992, U.S. Pat. Nos. 5,057, 475; 5,096,867; 5,055,438 and 5,227,440 and EP-A-0420436, WO 91/04257. In addition, the metallocene catalysts useful in this invention can include non-cyclopentadienyl catalyst components, or ancillary ligands such as boroles or carbollides in combination with a transition metal. Additionally, it is not beyond the scope of this invention that the catalysts and catalyst systems may be those described in U.S. Pat. No. 5,064,802 and PCT publications WO 93/08221 and WO 93/08199 published Apr. 29, 1993. All the catalyst systems of the invention may be, optionally, prepolymerized or used in conjunction with an additive or scavenging component to enhance catalytic productivity.

Illustrative examples of the metallocenes are dialkyl metallocenes such as bis(cyclopentadienyl)titanium di-methyl, bis(cyclopentadienyl)hafnium dimethyl, bis (cyclopentadienyl)zirconium di-neopentyl, etc. Other examples of metallocenes which can be usefully employed are monocyclopentadienyl titanocenes such as, pentamethyl-cyclopentadienyl titanium trichloride, substituted bis(Cp)Ti(IV) compounds such as bis(indenyl) titanium diphenyl etc. Illustrative examples of the zirconocenes which can be usefully employed are, pentamethylcyclopentadienyl zirconium tri-chloride, etc. Mixed cyclopentadienyl metallocene compounds such as cyclopentadienyl (pentamethyl cyclopentadienyl)-zirconium dichloride, can be employed. Bis(cyclopentadienyl)hafnium dichloride, is illustrative of other metallocenes. Some preferred metallocenes are bis(cyclopentadienyl)zirconium dimethyl; and the recemic and/or meso isomer of 1,2-ethylene-bridged bis-(4,5,6,7-tetra-hydroindenyl)zirconium dichloride.

The alumoxane compounds useful in the polymerization process may be cyclic or linear. Cyclic alumoxanes may be represented by the general formula $(R—Al—O)_n$ while linear alumoxanes may be represented by the general formula $R(R—Al—O)_n'AlR_2$. In the general formula R is a $C_1$-$C_5$ alkyl group such as, for example, methyl, ethyl, propyl, butyl and pentyl, n is an integer of from 3 to 20, and n' is an integer from 1 to 20. Preferably, R is methyl and n and n' are 4–18. Generally, in the preparation of alumoxanes from, for example, aluminum trimethyl and water, a mixture of the linear and cyclic compounds is obtained. Preferably, they are prepared by contacting water with a solution of aluminum trialkyl, such as aluminum trimethyl in a suitable organic solvent such as toluene or an aliphatic hydrocarbon. The mole ratio of aluminum in the alumoxane to total metal in the metallocenes which can be usefully employed can be in the range of 0.5:1 to 1000:1, and desirably 1:1 to 100:1. Preferably, the mole ratio will be in the range of 50:1 to about 5:1 and most preferably 20:1 to 5:1. The solvents used in the preparation of the catalyst system are inert hydrocarbons, in particular a hydrocarbon that is inert with respect to the catalyst system. Such solvents include isobutane, butane, pentane, etc.

Polymerization is generally conducted at temperatures ranging between 20° and 300° C., preferably between 30° and 200° C. Reaction time is not critical and may vary from several hours or more to several minutes or less, depending upon factors such as reaction temperature, the monomers to be copolymerized, and the like. The skilled artisan may readily obtain the optimum reaction time for a given set of reaction parameters by routine experimentation. The catalyst systems described herein are suitable for the polymerization of olefins in solution over a wide range of pressures. Preferably, the polymerization will be completed at a pressure of 10 to 3,000 bar, and generally at a pressure within the range of 40 bar to 2,000 bar, and most preferably, the polymerization will be completed at a pressure within the range from 50 bar to 1,500 bar. After polymerization and, optionally, deactivation of the catalyst (e.g., by conventional techniques such as contacting the polymerization reaction medium with water or an alcohol, such as methanol, propanol, isopropanol, etc., or cooling or flashing the medium to terminate the polymerization reaction), the product polymer can be recovered by known processes. Excess reactants may be flashed off. The polymerization may be conducted employing liquid monomer, such as liquid propylene or mixtures of liquid monomers (such as mixtures of liquid propylene and 1-butene as the reaction medium. Alternatively, polymerization may be accomplished in the presence of a hydrocarbon inert to the polymerization such as butane, pentane, isopentane, hexane, isooctane, decane, toluene, xylene, and the like. In those situations wherein the molecular weight of the polymer product that would be produced at a given set of operating conditions is higher than desired, any of the techniques known in the art for control of molecular weight, such as the use of hydrogen and/or polymerization temperature control, may be used in the process of this invention. If so desired, the polymerization may be carried out in the presence of hydrogen to lower the polymer molecular weight. Care should be taken, however, to assure that terminal ethenylidene unsaturation is not reduced below the preferred level of at least 30% of the polymer chains.

However, since the preferred polymers are reactive polymers possessing ethenylidene-type terminal unsaturation, it is preferred to prepare the polymers in the substantial absence of added $H_2$ gas, that is, the absence of $H_2$ gas added in amounts effective to substantially reduce the polymer molecular weight. More preferably, the polymerizations will be conducted employing less than 5 wppm, and more preferably less than 1 wppm, of added $H_2$ gas, based on the moles of the ethylene monomer charged to the polymerization zone.

When carrying out the polymerization in a batch-type fashion, the reaction diluent (if any), and the ethylene and alpha-olefin comonomer(s) are charged at appropriate ratios to a suitable reactor.

The polymerization may be conducted in a continuous manner by simultaneously feeding the reaction diluent (if employed), monomers, catalyst and cocatalyst to a reactor and withdrawing solvent, unreacted monomer and polymer from the reactor so as to allow a residence time of ingredients long enough for forming polymer of the desired molecular weight and separating the polymer from the reaction mixture.

Polyisobutylene is a most preferred backbone of the present invention because it is readily available by cationic polymerization from butene streams (e.g., using $AlCl_3$ catalysts). Such polyisobutylenes generally contain residual unsaturation in amounts of about one ethylenic double bond per polymer chain, positioned along the chain.

The polyisobutylene polymers employed are generally base on a hydrocarbon chain of from about chain of from about 900 to 2500. Polyisobutylene having an Mn of less than about 300 tends to give poor performance when employed as dispersant because the molecular weight is insufficient to keep the dispersant molecule fully solubilized in lubricating oils. Methods for making polyisobutylene are known. Polyisobutylene can be functionalized by halogenation (e.g. chlorination), the thermal "ene" reaction, or by free radical grafting using a catalyst (e.g. peroxide) as described below.

Other polymers, such as ethylene-alpha-olefin interpolymers having a number average molecular weight above 10,000 (e.g. 20,000 to 200,000)(e.g., ethylene-propylene copolymers and terpolymers containing non-conjugated dienes) are suitable polymers for the preparation of dispersants or multifunctional viscosity modifiers of the present invention. However, ethylene-alpha-olefin interpolymers of the above molecular weights could be produced using Ziegler-Natta catalysts only in combination with $H_2$ as molecular weight control in order to terminate the growing copolymer chains within this molecular weight range. Without use of $H_2$ or other conventional, so-called "chain-stoppers", the interpolymers produced with Ziegler-Natta catalysts would tend to have molecular weights greatly in excess of the above range. (Such higher copolymers, for example, are widely employed in ungrafted form as viscosity index improvers, and when functionalized and then derivatized with heavy polyamine, as described below, can be employed as dispersant-viscosity index improver polymers. (e.g. multifunctional viscosity modifiers))The use of $H_2$ as a chain stopper has the disadvantage of causing the saturation of the olefinic double bond content of the copolymer. Thus, while lower molecular weight copolymers were theoretically possible to prepare, their low unsaturation content (and the accompanying low graft copolymer yields) would have made their further functionalization by a thermal "ene" reaction, e.g., with dicarboxylic acid moieties in preparing dispersants, highly unattractive.

Preparation of Functionalized (Halogen Assisted, "Ene" Reacted or Free-Radically Grafted) Backbone The polymer or hydrocarbon may be functionalized, for example, with carboxylic acid producing moieties (preferably acid or anhydride)by reacting the polymer or hydrocarbon under conditions that result in the addition of functional moieties or agents, i.e., acid, anhydride, ester moieties, etc., onto the polymer or hydrocarbon chains primarily at sites of carbon-to-carbon unsaturation (also referred to as ethylenic or olefinic unsaturation)using the halogen assisted functionalization (e.g. chlorination) process or the thermal "ene" reaction. When using the free radical grafting process using a catalyst (e.g. peroxide), the functionalization is randomly effected along the polymer chain. In one embodiment, this selective functionalization can be accomplished by halogenating, e.g., chlorinating or brominating the unsaturated α-olefin polymer to about 1 to 8 wt. %, preferably 3 to 7 wt. % chlorine, or bromine, based on the weight of polymer or hydrocarbon, by passing the chlorine or bromine through the polymer at a temperature of 60° to 250° C., preferably 110° to 160° C., e.g., 120° to 140° C., for about 0.5 to 10, preferably 1 to 7 hours. The halogenated polymer or hydrocarbon (hereinafter backbones)is then reacted with sufficient monounsaturated reactant capable of adding functional moieties to the backbone, e.g., monounsaturated carboxylic reactant, at 100°to 250° C., usually about 180° C. to 235° C., for about 0.5 to 10, e.g., 3 to 8 hours, such that the product obtained will contain the desired number of moles of the monounsaturated carboxylic reactant per mole of the halogenated backbones. Alternatively, the backbone and the monounsaturated carboxylic reactant are mixed and heated while adding chlorine to the hot material.

In accordance with this invention, the hydrocarbon or polymer backbone can be functionalized, e.g., with carboxylic acid producing moieties (preferably acid or anhydride moieties)selectively at sites of carbon-to-carbon unsaturation on the polymer or hydrocarbon chains, or randomly along chains using the three processes mentioned above or combinations thereof in any sequence.

The preferred monounsaturated reactants that are used to functionalize the backbone comprise mono-and dicarboxylic acid material, i.e., acid, anhydride, or acid ester material, including (i)monounsaturated $C_4$ to $C_{10}$ dicarboxylic acid wherein (a) the carboxyl groups are vicinyl, (i.e., located on adjacent carbon atoms) and (b) at least one, preferably both, of said adjacent carbon atoms are part of said mono unsaturation; (ii)derivatives of (i) such as anhydrides or $C_1$ to $C_5$ alcohol derived mono-or diesters of (i); (iii) monounsaturated $C_3$ to $C_{10}$ monocarboxylic acid wherein the carbon-carbon double bond is conjugated with the carboxy group, i.e., of the structure —C=C—CO—; and (iv) derivatives of (iii) such as $C_1$ to $C_5$ alcohol derived mono-or diesters of (iii). Mixtures of monounsaturated carboxylic materials (i)–(iv) also may be used. Upon reaction with the backbone, the monounsaturation of the monounsaturated carboxylic reactant becomes saturated. Thus, for example, maleic anhydride becomes backbone-substituted succinic anhydride, and acrylic acid becomes backbone-substituted propionic acid. Exemplary of such monounsaturated carboxylic reactants are fumaric acid, itaconic acid, maleic acid, maleic anhydride, chloromaleic acid, chloromaleic anhydride, acrylic acid, methacrylic acid, crotonic acid, cinnamic acid, and lower alkyl (e.g., $C_1$ to $C_4$ alkyl) acid esters of the foregoing, e.g., methyl maleate, ethyl fumarate, and methyl fumarate. The monounsaturated carboxylic reactant, preferably maleic anhydride, typically will be used in an amount ranging from about 0.01 to about 20 wt. %, preferably 0.5 to 10 wt. %, based on the weight of the polymer or hydrocarbon.

While chlorination normally helps increase the reactivity of starting olefin polymers with monounsaturated functionalizing reactant, it is not necessary with the polymers or hydrocarbons contemplated for use in the present invention, particularly those preferred polymers or hydrocarbons which possess a high terminal bond content and reactivity. Preferably, therefore, the backbone and the monounsaturated functionality reactant, e.g., carboxylic reactant, are contacted at elevated temperature to cause an initial thermal "ene" reaction to take place. Ene reactions are known.

High molecular weight ethylene/propylene copolymer and ethylene/propylene/diene terpolymers, having number average molecular weights of from 20,000 to 200,000, are generally produced employing Ziegler catalysts, generally $VCl_4$ or $VOCl_3$ with a halide source, such as organoaluminum halides and/or hydrogen halides. Such high molecular weight EP and EPDM polymers find use as viscosity modifiers.

These high molecular weight ethylene/propylene interpolymers can be functionalized by random attachment of functional moieties along the polymer chains by a variety of methods. For example, the polymer, in solution or in solid form, may be grafted with the monounsaturated carboxylic reactant, as described above, in the presence of a free-radical initiator. When performed in solution, the grafting takes place at an elevated temperature in the range of about 100°to 260° C., preferably 120° to 240° C. Preferably, free-radical initiated grafting would be accomplished in a mineral lubricating oil solution containing, e.g., 1 to 50 wt.%, preferably 5 to 30 wt. % polymer based on the initial total oil solution.

The free-radical initiators which may be used are peroxides, hydroperoxides, and azo compounds, preferably those which have a boiling point greater than about 100° C. and decompose thermally within the grafting temperature range to provide free-radicals. Representative of these free-radical initiators are azobutyronitrile, 2,5-dimethylhex-3-ene-2,5-bis-tertiary-butyl peroxide and dicumene peroxide. The initiator, when used, typically is used in an amount of between 0.005% and 1% by weight based on the weight of the reaction mixture solution. Typically, the aforesaid monounsaturated carboxylic reactant material and free-radical initiator are used in a weight ratio range of from about 1.0:1 to 30:1, preferably 3:1 to 6:1. The grafting is preferably carried out in an inert atmosphere, such as under nitrogen blanketing. The resulting grafted polymer is characterized by having carboxylic acid (or ester or anhydride) moieties randomly attached along the polymer chains: it being understood, of course, that some of the polymer chains remain ungrafted. The free radical grafting described above can be used for the other polymers and hydrocarbons of the present invention. This functionalized high molecular weight copolymer then may be derivatized using a heavy polyamine.

Derivatization By Heavy Amines

The novel dispersants of the present invention are based on, for example, the polyolefins as disclosed in U.S. Ser. No. 992,192, filed Dec. 17, 1992, which are incorporated herein by reference for all purposes. These polymers can be functionalized using halogen assisted functionalization (e.g. chlorination), the thermal "ene" reaction, or via free radical grafting using a catalyst (e.g. peroxide). It has been found that the amine segment of the dispersant is very critical both to product performance of the dispersants and that dispersants made from heavy polyamine are superior to dispersants made from conventional polyamine mixtures (PAM).

For example, as the molecular weight of a dispersant backbone is increased, the polar segment of the molecule becomes the limiting factor in dispersancy performance with polyamine systems of the prior art such as triethylenetetramine and tetraethylenepentamine. Increasing the stoichiometric ratio of amine to polymer raises the nitrogen content, but results in significant levels of free unreacted polyamine which is detrimental to diesel engine and elastomer seal performance.

Using amines higher than heavy polyamines of the present invention is detrimental because higher amines are insoluble or only partially soluble in oils and result in a hazy product in a lubricating oil composition. Amines higher than heavy polyamine comprise less than about 6.0 milliequivalents of primary amine per gram (alternatively an equivalent weight of primary amine greater than about 160 grams per equivalent)and greater than about 12 nitrogens per molecule.

Typical disclosures of polyamine reactants for the preparation of lubricant dispersants teach a range of nitrogens per molecule of from 1–12, a variety of spacing groups between the nitrogens, and a range of substitution patterns on the amine groups. We have discovered that dispersants derived from the preferred compositions described below exhibit surprisingly enhanced dispersancy relative to the prior art while retaining superior solubility in oil.

Specifically, one embodiment of this invention comprises oil-soluble derivatized compositions of $C_2$–$C_{18}$ α-olefin polymers, copolymers, homopolymers or hydrocarbons, functionalized with carboxylic acid or anhydride moieties, further reacted with heavy polyalkylene polyamines which contain >28% N, more preferably >30% N, e.g. >32% N, and an equivalent weight of primary amine groups of between 120–160 g/eq, more preferably 120–150 g/eq, e.g. 125–140 g/eq. Best results are obtained when the polyamines contain more than 6 nitrogen atoms per molecule on the average (more preferably 7 or more, e.g. >8 nitrogen atoms per molecule), and more than two primary amines per molecule on the average (preferably >2.2, e.g. >2.4). Good results are obtained when the spacings between the nitrogens are $C_2$–$C_3$. The heavy polyamine preferably comprises essentially no oxygen.

Polyamines with these characteristics are commercially available and can be produced by distilling out the tetraethylenepentamine and most of the pentaethylenehexamine fractions from standard polyethyleneamine mixtures. Alternatively, they could be synthesized by cyanoethylation of the primary amine groups of polyethylene or polypropylene pentamines or hexamines followed by hydrogenation.

A preferred derivatization (imidization)process is described in U.S. Pat. No. 5,277,833 which is incorporated by reference herein in its entirety for all purposes.

In the process of the invention, the reaction between the functionalized backbone and the heavy polyamine is carried out for a time and under conditions sufficient to form imide groups on the functionalized polymer with the concomitant release of water. The progress of this reaction can be followed by infrared analysis.

Preparation of the Dispersant

The dispersant-forming reaction can be conducted in a polar or non-polar solvent (e.g., xylene, toluene, benzene and the like), and is preferably conducted in the presence of a mineral or synthetic lubricating oil.

The heavy polyamine is readily reacted with the selected material, e.g., polybutenyl substituted succinic acid or anhydride, by reacting an oil solution containing 5 to 95 wt. % of the polymer substituted mono-or dicarboxylic acid or anhydride material at about 100° to 250° C., preferably 125° to 175° C., generally for 1 to 10, e.g., 2 to 6 hrs. until the desired amount of water is removed. The heating is preferably carried out to favor formation of imides or mixtures of imides and amides, rather than amides and salts.

Reaction ratios of polymer functionalized mono-and dicarboxylic acid or anhydride material to equivalents of amine can vary considerably, for example, depending on the reactants and type of bonds formed. For example, when the polymer comprises a polymer substituted dicarboxylic acid material, containing dicarboxylic acid producing moieties derived from monounsaturated dicarboxylic acids, or anhydride or ester derivatives thereof, generally from 0.1 to 5, preferably from about 0.5 to 2, e.g., 0.8 to 1.2 equivalents of dicarboxylic acid moiety content (e.g., grafted maleic anhydride content)is used, per equivalent of primary amine of the heavy polyamine.

Dispersants

Dispersants maintain oil insolubles, resulting from oil use, in suspension in the fluid thus preventing sludge flocculation and precipitation. Suitable dispersants include, for example, dispersants of the ash-producing (also known as detergents) and ashless type, the latter type being preferred. The derivatized polymer or hydrocarbon compositions of the present invention, can be used as dispersants and multifunctional viscosity index improvers in lubricant and fuel compositions.

Post Treatment

The derivatized polymers may be post-treated. The processes for post-treating the derivatized polymer or hydrocarbon are analogous to the post-treating processes used with respect to conventional dispersants and MFVM's of the prior art. Accordingly, the same reaction conditions, ratio of reactants and the like can be used. Accordingly, derivatized polymer or hydrocarbon can be post-treated with such reagents as urea, thiourea, carbon disulfide, aldehydes, ketones, carboxylic acids, hydrocarbon-substituted succinic anhydrides, nitriles, epoxides, boron compounds, phosphorus compounds, or the like.

The amine derivatized polymers or hydrocarbons of the present invention as described above can be post-treated, particularly for use as dispersants and viscosity modifiers by contacting said polymers or hydrocarbons with one ore more post-treating reagents such as boron compounds, nitrogen compounds, phosphorus compounds, oxygen compounds, succinic acids and anhydrides (e.g., succinic anhydride, dodecyl succinic anhydride, and $C_1$ to $C_{30}$ hydrocarbyl substituted succinic anhydride), other acids and anhydrides such as maleic and fumaric acids and anhydrides, and esters of the foregoing e.g., methyl maleate. The amine derivatized polymers or hydrocarbons are preferably treated with boron oxide, boron halides, boron acid esters or boron ester in an amount to provide from 0.1–20.0 atomic proportions of boron per mole of nitrogen composition. Borated derivatized polymer useful as dispersants can contain from 0.05 to 2.0 wt. %, e.g. 0.05 to 0.7 wt. % boron based on the total weight of said borated nitrogen-containing dispersant compound.

Treating is readily carried out by adding said boron compound, preferably boric acid usually as a slurry, to said nitrogen compound and heating with stirring at from about 135° to 190° C., e.g. 140° to 170° C., for from 1 to 5 hours.

The derivatized polymers or hydrocarbons of the present invention can also be treated with polymerizable lactones (such as epsilon-caprolactone) to form dispersant adducts.

Lubricating Compositions

The additives of the invention may be used by incorporation into an oleaginous material such as fuels and lubricating oils. Fuels include normally liquid petroleum fuels such as middle distillate boiling from 65° to 430° C., including kerosene, diesel fuels, home heating fuel oil, jet fuels, etc. A concentration of the additives in the fuel is in the range of typically from 0.001 to 0.5 wt. %, and preferably 0.005 to 0.15 wt. %, based on the total weight of the composition, will usually be employed.

The additives of the present invention may be used in lubricating oil compositions which employ a base oil in which the additives are dissolved or dispersed therein. Such base oils may be natural or synthetic. Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the additive mixtures of the present invention in base oils conventionally employed in and/or adapted for use as power transmitting fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

Natural oils include animal oils and vegetable oils (e.g., castor, lard oil)liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils.

Synthetic lubricating oils include hydrocarbon oils and halosubstituted hydrocarbon oils such as polymerized and interpolymerized olefins (e.g., polybutylenes, polypropylenes, propylene-isobutylene copolymers, chlorinated polybutylenes, etc. Alkylene oxide polymers and interpolymers and derivatives thereof where the terminal hydroxyl groups have been modified by esterification, etherification, etc., constitute another class of known synthetic lubricating oils. Another suitable class of synthetic lubricating oils comprises the esters of dicarboxylic acids. Esters useful as synthetic oils also include those made from $C_5$ to $C_{12}$ monocarboxylic acids and polyols and polyol ethers such as neopentyl glycol, etc. Silicon-based oils such as the polyalkyl-, polyaryl-, polyalkoxy-, or polyaryloxysiloxane oils and silicate oils comprise another useful class of synthetic lubricants. Unrefined, refined and rerefined oils can be used in the lubricants of the present invention.

The additives of the present invention, particularly those adapted for use as dispersants or viscosity modifiers, can be incorporated into a lubricating oil in any convenient way. Thus, they can be added directly to the oil by dispersing or dissolving the same in the oil. Such blending into the additional lube oil can occur at room temperature or elevated temperatures. Alternatively, the additives may be first formed into concentrates, which are in turn blended into the oil. Such dispersant concentrates will typically contain as active ingredient (A.I.), from 10 to 80 wt. %, typically 20 to 60 wt. %, and preferably from 40 to 50 wt. %, additive, (based on the concentrate weight)in base oil. MFVI concentrates typically will contain from 5 to 50 wt. % AI.

The additives of the invention may be mixed with other additives selected to perform at least one desired function. Typical of such additional additives are detergents, viscosity modifiers, wear inhibitors, oxidation inhibitors, corrosion inhibitors, friction modifiers, foam inhibitors, rust inhibitors, demulsifiers, antioxidants, lube oil flow improvers, and seal swell control agents.

Compositions, when containing these additives, typically are blended into the base oil in amounts which are effective to provide their normal attendant function. Representative effective amounts of such additives are illustrated as follows:

| Compositions | (Broad) Wt. % | (Preferred) Wt. % |
|---|---|---|
| V.I. Improver | 1–12 | 1–4 |
| Corrosion Inhibitor | 0.01–3 | 0.01–1.5 |
| Oxidation Inhibitor | 0.01–5 | 0.01–1.5 |
| Dispersant | 0.1–10 | 0.1–5 |
| Lube Oil Flow Improver | 0.01–2 | 0.01–1.5 |
| Detergents and Rust Inhibitors | 0.01–6 | 0.01–3 |
| Pour Point Depressant | 0.01–1.5 | 0.01–1.5 |
| Anti-Foaming Agents | 0.001–0.1 | 0.001–0.01 |
| Antiwear Agents | 0.001–5 | 0.001–1.5 |
| Seal Swellant | 0.1–8 | 0.1–4 |
| Friction Modifiers | 0.01–3 | 0.01–1.5 |
| Lubricating Base Oil | Balance | Balance |

When other additives are employed, it may be desirable, although not necessary, to prepare additive concentrates or packages comprising concentrated solutions or dispersions of the subject additives of this invention together with one or more of said other additives. Dissolution of the additive concentrate into the lubricating oil may be facilitated by solvents and by mixing accompanied with mild heating, but this is not essential. The final formulations may employ typically 2 to 20 wt. %, e.g. about 10 wt. %, of the additive package with the remainder being base oil.

All of said weight percents expressed herein (unless otherwise indicated) are based on active ingredient (A.I.) content of the individual additives, and the total weight of the additive package or formulation, which will include the weight of total oil or diluent.

EXAMPLES

The following examples are representative of succinimide dispersants prepared from heavy polyamine.

Example 1 (Comparative)—Preparation of PIBSA/PAM Dispersant 400 grams (0.1376 equivalents of succinic anhydride)of a polyisobutenyl succinic anhydride (PIBSA)diluted with 80 grams Exxon S150N base oil and derived from a 2225 number average molecular weight polyisobutylene having a saponification number after dilution with the oil of 38.6, prepared via the chlorination process, were charged into a reaction flask equipped with a thermometer, air stirrer, and nitrogen inlet tube. The dilute PIBSA was diluted with 211.2 grams of S150N and heated to 150° C. Thereafter, 15.9 grams of commercial PAM (0.1376 eq. of primary amine) having about 33.5 wt. % total nitrogen were added dropwise to the reaction mixture under a nitrogen blanket. After the addition was completed, the reaction mixture was nitrogen stripped at 150° C. for 2 hrs. The resulting product analyzed for 0.85% nitrogen.

Example 2 (Comparative)—Boration of Example 1

560 grams of the above reaction product were heated to 145° C. and 6.08 grams of boric acid were added for a period of one hour. At the end of the addition, the reaction mixture was heated to 150° C. and nitrogen stripped for one hour. The filtered oil solution analyzed for 0.78% nitrogen and 0.19% boron.

Example 3—Preparation of PIBSA/HA-2 Heavy Amine Dispersant 400 grams (0.1376 equivalents of succinic anhydride) of the PIBSA of example 1 were diluted and reacted in substantially the same manner as example 1 but using 17.9 grams (0.1376 eq. primary amine) of heavy polyamine from Dow Chemical Company identified as HA-2 PAM (32.8 wt. % total nitrogen) and 215 grams of S150 N. The resulting dispersant analyzed for 0.98% nitrogen. Example 4—Boration of Example 3

560 grams of the product of example 3 were borated with boric acid in substantially the same manner as in example 2, using 6.08 grams of boric acid. The oil solution of the filtered product analyzed for 0.97% nitrogen and 0.19% boron.

SLUDGE BENCH TEST RESULTS

SIB (Sludge Inhibition Bench Test)

The SIB test forecasts the performance of a lubricant in a gasoline engine. The test is described below:

The SIB test employs a used crankcase mineral lubricating oil composition having an original viscosity of about 325 SSU at 37.8° C. that has been used in a taxicab driven generally for short trips only thereby causing a build up of a high concentration of sludge precursors. The oil used contains only a refined base mineral oil, a viscosity index improver, a pour point depressant and a zinc dialkyldithiophosphate antiwear additive. The oil contains no sludge dispersants. Such used oil is acquired by draining and refilling taxicab crankcases at about 1,000–2,000 mile intervals.

The SIB test is conducted in the following manner: The used crankcase oil is freed of sludge by centrifuging for one half hour at about 39,000 gravities (gs). The resulting clear bright red oil is then decanted from the insoluble sludge particles. However, the supernatant oil still contains oil-soluble sludge precursors which, under the conditions employed by this test, will tend to form additional oil-insoluble deposits of sludge. The sludge inhibiting properties of the additives being tested are determined by adding to portions of the used oil 0.5 wt. %, on an active basis, of the particular additive being tested. Ten grams of each oil sample being tested is placed in a stainless steel centrifuge tube and is heated at 140° C. for 16 hrs. in the presence of air. Following the heating, the tube containing the oil being tested is cooled and then centrifuged for 30 min. at about 39,000 gs. Any deposits of new sludge that form in this step are separated from the oil by decanting supernatant oil and then carefully washed with 15 ml. of pentane to remove all remaining oils from the sludge. The weight, in milligrams, of the new solid sludge that forms in the test is determined by drying the residue and weighing it. The results are reported as milligrams of sludge per ten grams of sludge, thus measuring differences as small as one part per ten thousand. The less new sludge formed, the more effective is the additive as a dispersant. In other words, if the additive is effective, it will hold at least a portion of the new sludge that forms on heating and oxidation, stably suspended in the oil so that it does not precipitate during the centrifuging period.

Samples of the dispersants prepared as set forth in Examples 1–4 below were subjected to a standard sludge inhibition bench test (SIB). The samples of the PIBSA-PAM were subjected to the SIB test to provide a basis of comparison between the PIBSA-heavy amine dispersant of this invention and the corresponding prior art PIBSA-PAM dispersants.

| Example # | Compound | SIB Results (mgs sludge/10 grams sludge) Concentration | |
|---|---|---|---|
| | | 0.3% | 0.5% |
| 1 (Comparative) | PIBSA-2225/PAM | 7.92 | 3.8 |
| 2 (Comparative) | B-PIBSA-2225/PAM | 5.10 | 4.0 |
| 3 | PIBSA-2225/HA-2 | 4.30 | 0.24 |
| 4 | B-PIBSA-2225/HA-2 | 1.15 | 0.48 |
| Blank | | 10.0 | |

The SIB results indicate that dispersants made from HA-2 heavy polyamine have superior sludge dispersancy properties than those made from commercial PAM at equivalent active ingredient for both non-borated as well as borated materials. Lower values indicate better dispersancy performance.

Example 5

To 630 grams (1.0 equivalents of succinic anhydride) of a polyisobutenyl succinic anhydride of about 450 number average molecular weight and having a saponification number of 178, available from Mobil Chemical Company identified as MCP 1515, was added 244 grams of Exxon Solvent 150 neutral base oil and heated to 150° C. in a 2 liter 4 neck flask, equipped with a stirrer, 125 ml dropping funnel, thermometer and sparger. To the mixture was added 119 grams (0.91 equivalents of primary amine)of HA-2 heavy polyamine over 40 min. The mixture was nitrogen sparged for 90 min. The product analyzed for 4.03% nitrogen. The product may be used as a dispersant additive for two-cycle engine oils.

What is claimed is:

1. An oil soluble dispersant comprising the reaction product of a hydrocarbon having at least one carboxylic acid, ester or anhydride functional group, and a heavy polyamine, wherein said heavy polyamine comprises a mixture of polyamines, a majority of said polyamines having 6 to 12 nitrogens per molecule, said mixture having an average of 7 or more nitrogens per molecule, a nitrogen content of more than about 28 wt. %, an equivalent weight of about 120–160 grams per equivalent of primary amine and comprising less than about 26 wt. % hexamine and lower amines.

2. The dispersant of claim 1 wherein said hydrocarbon is a polymer.

3. The dispersant of claim 2 wherein said functionalized polymer is a polybutenyl succinic acid or anhydride.

4. The dispersant of claim 2 wherein said polymer comprises ethylene/alpha-olefin copolymer having a number average molecular weight greater than 300.

5. The dispersant of claim 4 wherein said polymer comprises ethylene/propylene or ethylene/butene copolymer.

6. An additive for use in a two-cycle engine oil comprising the dispersant of claim 2, wherein said polymer has an average molecular weight less than 300.

7. The dispersant of claim 1 wherein said heavy polyamine comprises substantially no oxygen.

8. The dispersant of claim 1 wherein said heavy polyamine has an equivalent weight of about 125–140 grams per equivalent of primary amine.

9. The dispersant of claim 1 wherein said heavy polyamine comprises less than about 1 wt. % pentamines and lower polyamines and less than about 25 wt. % hexamines.

10. The dispersant of claim 9, wherein said heavy polyamine contains about 5 wt. % to about 15 wt. % hexamines.

11. The dispersant of claim 1 wherein said funtionalized hydrocarbon has an average of up to two functional groups.

12. An oleaginous composition comprising the disperant of claim 1.

13. An oleaginous composition comprising the dispersant of claim 1 and a base oil in the form of a lubricating oil or lubricating oil additive package.

14. The dispersant of claim 1 wherein said heavy polyamine has a primary amine content of at least about 6.3 to about 8.5 milliequivalents of primary-amine per gram, and a total nitrogen content of at least about 32 wt. %.

15. The dispersant of claim 1, wherein said heavy polyamine has a primary amine content of about 7.7 to about 8.5 milliequivalents of primary amine per gram of polyamine and at least 2.2 primary amine groups per molecule.

16. A process for producing an oil soluble dispersant comprising the steps of a) functionalizing by halogenating, ene reacting or free radical grafting a hydrocarbon backbone with a carboxylic acid or anhydride agent; and b) reacting the functionalized hydrocarbon backbone with a heavy polyamine, wherein said heavy polyamine comprises a mixture of polyamines, a majority of said polyamines having 6 to 12 nitrogens per molecule, said mixture having an average of 7 or more nitrogens per molecule, a nitrogen content of more than about 28 wt. %, an equivalent weight of about 120–160 grams per equivalent of primary amine and comprising less than about 26 wt. % hexamine and lower amines.

17. The process of claim 16 wherein said agent is an anhydride comprising maleic anhydride.

18. The process of claim 16 wherein said backbone is halogenerated in a chlorination step.

19. The process of claim 16, wherein said heavy polyamine is formed by distilling light fractions from a polyamine bottoms product to yield a said heavy polyamine, said heavy polyamine having less than 1 wt. % pentamines and less than 25 wt. % hexamines.

20. The process of claim 19, wherein said functionalized hydrocarbon backbone is a functionalized polymer having a number average molecular weight of greater than about 600, and wherein said heavy polyamine is reacted with said functionalized polymer in a stoichiometric ratio of 0.5 to 2 equivalents of functional group per equivalent of primary amine.

* * * * *